Aug. 23, 1949.  A. G. THOMAS  2,479,986

CLUTCH

Filed Aug. 11, 1947  2 Sheets-Sheet 1

INVENTOR.
Albert G. Thomas

Aug. 23, 1949.    A. G. THOMAS    2,479,986
CLUTCH

Filed Aug. 11, 1947    2 Sheets-Sheet 2

Albert G. Thomas  INVENTOR.

Patented Aug. 23, 1949

2,479,986

UNITED STATES PATENT OFFICE 2,479,986

CLUTCH

Albert G. Thomas, Lynchburg, Va.

Application August 11, 1947, Serial No. 767,989

15 Claims. (Cl. 172—284)

This invention relates to clutch and transmissions, and particularly to magnetic and low inertia clutch for general use.

In driving shafts or other members to carry power or for other purposes, it is frequently necessary or desirable to disconnect the driving shaft from the driven shaft or other member. It is also frequently desirable to connect the driving shaft and the driven shaft. In many applications, it is important to provide quick connections or disconnections without undue shock to the mechanism. It is therefore an object to provide a clutch that can be used to effect rapid connection or disconnection of a driven shaft and a driving shaft.

Another object is to provide a magnetic clutch which has strong holding force but which can be quickly released.

A further object is to provide a low inertia clutch the driven element of which can be quickly accelerated or decelerated.

An additional object is to provide a magnetic clutch of efficient design so that strong clutch action is obtained with a moderate magnetizing current.

A further object is to provide a magnetic clutch in which the clutch driven element is quickly brought up approximately to the speed of the clutch driving element.

A further object is to provide a magnetic clutch the driven element of which can be quickly brought to rest by means including an associated inertia element.

Another object is to provide controls for magnetic clutches.

Other objects will be evident in the following description.

Figure 1:
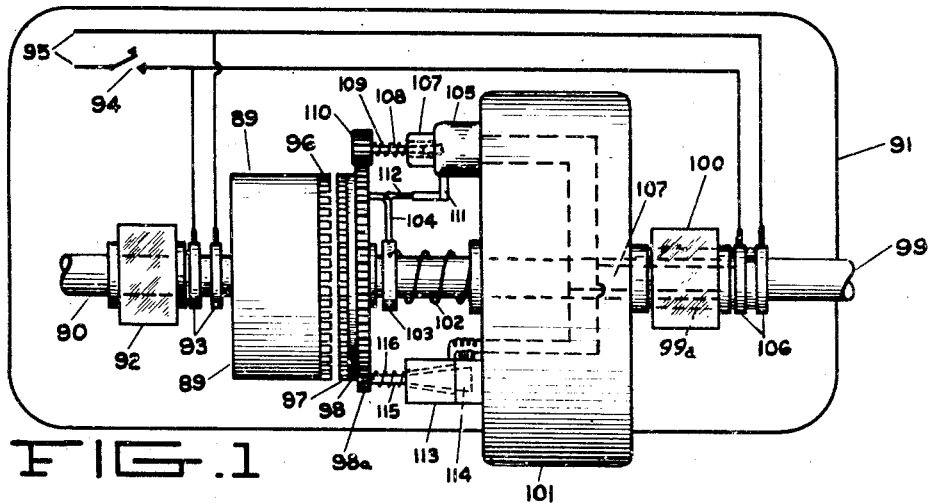
Figure 1 is a top plan view of a magnetic clutch with means for accelerating or decelerating the driven element.
Figure 1A:
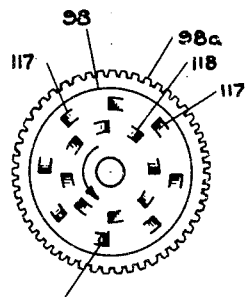
Figure 1a is an elevation of disc 98 viewed from the right, showing face notches.
Figure 2:
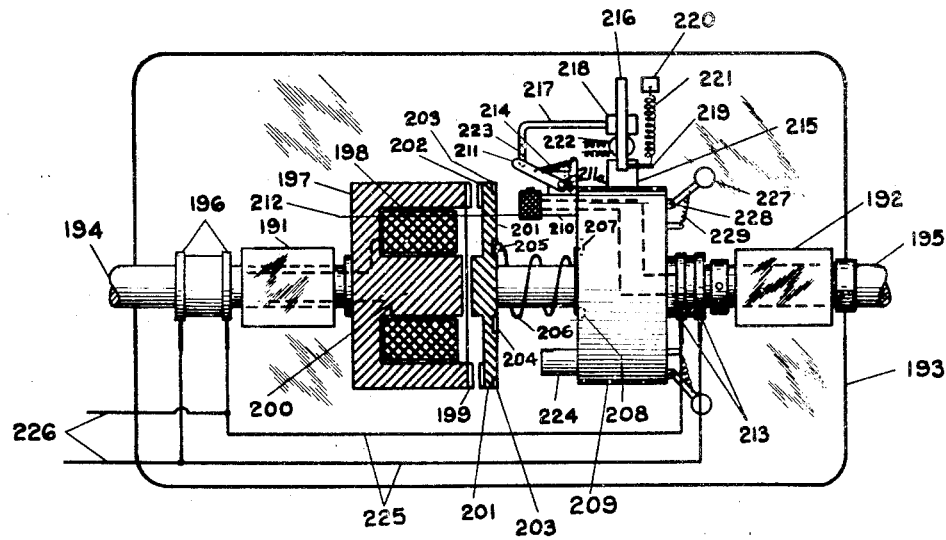
Figure 2 is a part sectional top plan view of an inertia type magnetic clutch in which the driven element is quickly brought to rest after deenergization of the clutch.
Figure 3:
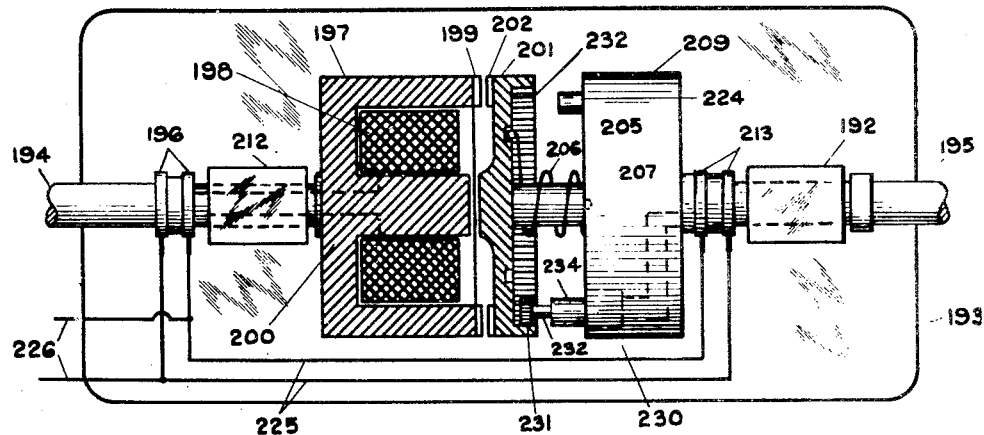
Figure 3 is a part sectional top plan view of a modified inertia type clutch.

In Figure 1 the driving field member 89 may be similar to that shown in Figure 2 or 3. This member is carried by shaft 90 having rotary bearing in post 92 extending from base 91. It should be understood that in this and other modifications actual posts need not be used but the shaft bearings can be supported directly by the framework or casing of the clutch.

Field element 89 may be energized through slip rings 93 by closing switch 94 which connects supply lines 95 in circuit with the winding of field element 89. This field element has circular row of spaced teeth 96 around its inner face. These teeth may be circularly aligned with magnetizable teeth 97 circularly spaced around the face of magentizable disc 98 which has attached or integral circumferential gear 98a and is carried concentrically by rigidly attached driven shaft 99 having rotary bearing in post 100 and in a similar post not shown.

Cylindrical inertia element 101 is axially bored and is rotatable on shaft 99 around which torsion spring 102 is coiled and the ends of which are fastened to inertia element 101 and to collar 103 which is rotatable on shaft 99. This collar carries pawl 104 which is movable in one direction around the adjacent face of disc 98 having a circular row of spaced notches or cams but is not movable in opposite direction unless the disc is carried with the pawl. In other words, a ratchet construction is provided so that spring 102 may be wound in one direction without rotating disc 98 but which will rotate the disc in opposite direction if the disc is released while the sprng is under torsion.

Relatively small electric motor 105 is attached to the left face of inertia element 101 and may be supplied current from lines 95 by means of slip rings 106 on sleeve 99a fastened to element 101 and conductors 107 passing through channels in sleeve 99a and element 101. Motor 105 has attached solenoid 107 electrically connected therewith. Magnetizable solenoid plunger 108 is keyed to the tubular motor shaft and may be forced out of this shaft against the force of tension spring 109 tending to pull pinion 110, carried by plunger 108, out of mesh with gear 98a. A suitable pin, collar, or other stop is provided to prevent pinion 110 from being moved too far to the left. The inner end of tapered plunger 108 is of larger diameter than the outer end.

Switch 111, in circuit with motor 105 and solenoid 107, is fastened to the motor and has toggle arm 112 positioned to be struck by a portion of pawl 104 to close the circuit after pawl 104 passes the switch in relative forward direction of rotation of disc 98 and the pawl, and the switch opens the circuit when arm 112 is struck by the pawl, moving in reverse relative direction. The notches 118 in the face of disc 98 are inclined so that pawl 104 engages the disc to rotate it in reverse direction but not in forward direction which is considered as the direction of rotation of disc 98 when revolved by magnetized driving field member 89 rotated counter-clockwise when viewed from the right. The notches 118 are concentrically distributed around the face of disc 98.

Solenoid 113 is attached to the face of inertia element 101 and may be placed diametrically opposite from motor 105, for dynamic balancing purposes. Tapered plunger 114 carries pawl or lock 115 which is normally held out of engagement with the face of disc 98 by tension spring 116 attached to the pawl and to solenoid 113. There is sufficient space in the base of the solenoid to allow movement of plunger 114. When solenoid 113 is supplied with current through the connected conductors 107 the pawl 115 is pulled over against the face of disc 98 and is pressed into one of the concentrically arranged notches 117 which have bottom surfaces inclined so that pawl or rod 115 will allow relative rotation of disc 98 in forward direction as represented by the arrow but will prevent relative rotation of the disc in reverse direction. Notches 117 are distributed around the face of disc 98 at a greater radius than that of notches 118.

In operation, assume that switch 94 is open and that all driven parts of the clutch are stationary. Pinion 110 is out of mesh with gear 98a and pawl or rod 115 is pulled away from the disc 98 by spring 116. Assuming that shaft 90 is being rotated, when it is desired to cause rotation of driven disc 98 and attached shaft 99 switch 94 is closed so that the winding of magnetic field member 89 is energized and teeth 96 become magnetized. The poles of these teeth then strongly magnetize teeth 97 of disc 98 with opposite poles, by induction, and so disc 98 is started revolving in forward direction as indicated by the arrow of Figure 8a. Simultaneously solenoid 113 is energized so that pawl 115 is quickly and yieldingly forced against the adjacent face of disc 98, allowing relative rotation of this disc in forward direction but not in reverse direction.

Motor 105 is simultaneously energized along with field member 89 and solenoid 113, and starts rotating in a direction to roll inertia element 101 around shaft 99 in opposite direction to the shaft's forward rotation as determined by the direction of rotation of disc 98. The notches 118 have bottom surfaces oppositely inclined to those of notches 117 and therefore hold pawl 104 as inertia element 101 is rotated in reverse so that spring 102 is put in torsion. It will be observed that pawl 115 will allow this relative movement but will lock element 101 against relative forward rotation which would cause unwinding of spring 102 when motor 105 is deenergized. The spring is therefore quickly wound as described and is locked in wound condition so that disc 98 and element 101 are rotated in forward direction as shown by the arrow of Figure 8a but element 101 is prevented from being rotated by spring 102 in forward direction as related to disc 98.

Since spring 102 will always return inertia element 101 to the same angular position as related to pawl 104, when they are free for relative movement, pawl 104 can be arranged so that its normal position, before closing switch 94, will be adjacent arm 112 of switch 111 and practically a full revolution of relative movement of the switch arm and pawl will be necessary before the switch arm is moved in opposite direction by pawl 104. Therefore, after inertia element 101 is rotated nearly a full revolution in reverse direction relative to forward-driven disc 98, arm 112 will strike pawl 104 and that arm will be snapped over so that switch 111 is opened. When this happens motor 105 is deenergized and solenoid 107 is likewise deenergized so that spring 108 pulls pinion 110 out of engagement with gear 98a.

Now, when switch 94 is opened to stop rotation of driven disc 98, solenoid 113 is deenergized so that spring 116 quickly pulls rod or pawl 115 out of engagement with disc 98 and so coiled spring 102 gives disc 98, through pawl 104, a reverse blow or sudden torque which may be calibrated to be just sufficient to bring it quickly to rest. Inertia element 101, which is preferably much heavier or has much more inertia than disc 98, is simultaneously kicked in forward direction and it spins freely on shaft 99. This forward rotation of element 101 relative to virtually stationary disc 98 causes switch arm 112 to be snapped in opposite direction to close switch 111 but the circuit has been opened by switch 94. Switch 112 is therefore in closed condition, ready for the next energization of the circuit when switch 94 is again closed to cause rotation of disc 98.

The inertia of element 101 is not necessarily greater than that of disc 98 but may be equal to or even less than that of the disc. Spring 102 can be sufficiently stiff so that only one revolution is necessary in order to wind it sufficiently, or switch 111 can be a step type which requires a number of operations of arm 112 before the switch is opened or closed. Suitable stops can be provided on element 101 to limit movement of pawl 104 relative thereto, if that is preferred. This or any of the other inertia or hydraulic methods described can be used to stop one member of a similar split or two member flywheel for use on machine tools.

A simpler construction is possible. Solenoid 113, pawl 115, switch 111 and solenoid 107 can be eliminated and pinion 110 can remain in mesh with gear 98a at all times. In that event, when switch 94 is closed motor 105 will revolve until spring 102 is wound sufficiently to stop the motor which can be designed to withstand relatively heavy currents. Then, opening switch 94 will deenergize motor 105 so that pinion 110 and the motor armature will be rapidly revolved by the rearward rotating disc 98 and gear 98a which are kicked backward relatively as element 101 is kicked forward.

It is obvious the same general principles can be employed to accelerate the driven disc from a stationary position when switch 94 is closed. In the latter case the spring will be wound in a direction to kick disc 98 forward on closing switch 94 which can then energize a solenoid similar to element 113 so that a lock or pawl similar to 115 will be pulled away from the disc to release it. The solenoid would pull the plunger toward inertia element 101 rather than away from it. Motor 105 can be used to wind the spring but in reverse direction, and the pawls and notches would be reversely arranged.

Shaft 99 could carry two complete inertia systems, one to cause acceleration of the disc 98 when switch 94 is closed and the other to cause deceleration of the disc when that switch is opened. It may be possible to use the same inertia element for both systems.

While a motor is shown for winding the spring it is apparent that a solenoid, magnet, or other means can be used to accomplish the same purpose. Furthermore, liquids or gases under pressure can be used to move pistons or other elements, for accelerating or decelerating purposes.

In Figure 2, bearings 191 and 192 extending from base 193 support driving shaft 194 and driven shaft 195, respectively, for rotary movement. Suitable collars are provided to prevent axial movement of the shafts. Shaft 194 carries slip rings 196 and also magnetizable iron or silicon steel field member 197, having an annular slot in which annular winding or coil 198 is placed so that annular row of radially disposed teeth 199 around the inner face of member 197 may be magnetized. Central core member 200 allows return of magnetic flux.

Driven disc 201 with thicker center portion, is of iron, or steel, has circular row of radially disposed teeth 202 around its inner face and has a plurality of peripheral notches 203 perferably uniformly spaced at close intervals. This disc also has a plurality of circularly arranged equally spaced face notches 204 with bottom surfaces sloping so that pawl 205 attached to one end of torsion spring 206 will hold the disc against relative movement in one direction but not in the reverse direction. It will be assumed that the notches will engage pawl 205 to wind spring 206 when magnetized field element 197 pulls the disc around in counter clockwise direction when viewed from the right but not in reverse direction. In that event pawl 207 atached to the other end of the spring will be engaged by a circular row of notches 208 in the adjacent face of inertia element 209 when that element, which is rotatable on shaft 195, is revolved in clockwise direction relative to pawl 207 when viewed from the right, but slippage will occur in opposite relative direction. It is obvious that ball or roller type overrunning oppositely directed clutches can be used between the ends of the spring and the disc and inertia element in place of the pawls and notches as described.

Block 210 is attached to the inner face of element 209, which element may be cylindrical, and latch 211 is pivoted at 211a to the block which also has attached magnet coil 212 the terminals of which are connected to slip rings 213 carried by a sleeve on element 209. Suitable conductors in channels in the block and inertia element connect the slip rings and the magnet coil.

Latch 211 is preferably of easily magnetizable soft iron or steel and has a projection beyond the pivot to serve as a stop to limit upward movement urged by spring 214 attached to the latch and extension of the block. Cam 215 is attached to the periphery of inertia element 209 and is adapted to strike the lower end of arm 216 which is rigidly fastened to rod 217 having rotary bearing in supports 218 fixed to base 193 or to some other fixed part of the device. Arm 216 has attached, extending pin 219 near one end and fixed post 220 extends from base 193 near the other end. Tension spring 221 is connected to post 220 and to pin 219 as indicated so that snap action of arm 216 about its pivot is provided. Magnet coil 222 is fixed to the framework or base, below arm 216 and on the pin side of the pivot. Arm 216 is of soft iron or other easily magnetized material. It is arranged so that when magnet 222 is energized, the arm is snapped down against the magnet and is held in that position by spring 221. When cam 215 strikes the arm 216 from beneath, due to spring 206 tending to turn element 209 around with disc 201, the tension of spring 221 causes arm 216 to hold cam 215 and element 209 until disc 201 is rotated enough to develop sufficient torsion in spring 206 to cause cam 215 to force arm 216 up so that spring 221 snaps it up against a suitable stop. In this position cam 215 will not strike arm 216 as element 209 is rotated.

The left end of rod 217 is bent and is shaped to form cam 223 inclined to strike and force latch 211 downward when there is proper relative movement between them. Weight 224 may be attached to the face of inertia element 209 as a dynamic balance for block 210 and attached mechanism.

Slip rings 196 and 213 are connected together by means of associated brushes and conductors 225 so that connected supply lines 226 will energize or deenergize winding 198 and magnet 212 simultaneously. Latch 211 is arranged so that it will not be pulled down by the magnet, even through energized, when the latch is in the lifted position shown. When, however, cam 223 strikes the latch and forces it closer to magnet 212, then the magnet holds the latch down so that it enters one of the notches 203 and locks inertia element 209 to disc 201 so that they rotate together. When magnet 212 is deenergized, spring 214 lifts the latch again to the position indicated.

Cam 223 may have inclined surfaces on both sides so that it will depress latch 211 regardless of the direction of rotation of inertia element 209. Considering one direction of rotation of driving element 197 and driven disc 201, i. e., counterclockwise when viewed from the right; cam 223 may be arranged to be out of the path of latch 211 when arm 216 is held down against magnet 222 either by magnetism or by spring 221. When cam 215 strikes arm 216 to cause spring 221 to snap that arm out of the path of cam 215, cam 223 simultaneously snaps past latch 211 and forces it close enough to energize magnet 212 for the latter quickly to attract and hold the latch in one of the notches 203. The positions of cam 223 and the latch are arranged with respect to arm 216 and cam 215, respectively, so that latch 211 will not allow appreciable relative angular movement between the disc and the inertia element before the two are mutually locked, after cam 215 snaps arm 216 over.

In operation, considering that drive shaft 194 is being rotated, disc 201 can be rotated by connecting supply lines 226 in circuit so that field winding 198 and magnet 212 are simultaneously energized. When this happens the magnetized teeth 199 will induce opposite magnetic poles in teeth 202 and so disc 201 will be magnetically dragged around by magnetized field element 197. As disc 201 is revolved in direction previously described, spring 206 will be wound around shaft 195 until sufficient torsion is developed in the spring to overcome the resistance of arm 216 which depends upon the tension of spring 221 which, in the meantime has been holding cam 215 and inertia element 209 stationary. When, however, the torsion developed in spring 206 causes cam 215 to snap arm 216 out of its path, latch 211 is immediately forced into a notch 203 by cam 223 so that the disc and inertia element are locked to rotate as a unit, with spring 206 in the wound state.

When it is desired to release disc 201 from magnetic coupling with field element 197, the circuit including supply lines 226 is opened so that winding 198 and magnet 212 are deenergized. When this happens latch 211 is released so that spring 214 quickly pulls it out of its associated notch 203 and spring 206 gives disc 201 a quick pulse or kick in reverse direction and simultaneously gives inertia element 209 a kick in forward direction. The tension of the spring and the inertia of the disc and element 209 can be so chosen that disc 201 will be brought to a standstill almost immediately and element 209 will continue to rotate freely in forward direction on shaft 195, since pawl 207 and associated notches in the face of element 209 allow free rotation in that direction. Similarly, pawl 205 and the notches in the face of disc 201 allow that disc to rotate freely in reverse direction, if such rotation is desired.

While element 209 may be of relatively great inertia as compared to the inertia of disc 201, it will be observed that when the field element is first magnetized, only disc 201 is rotated and then the resistance increases as the spring is wound.

When it is desired magnetically to engage driven disc 201 again, magnet 222 is first energized to pull arm 216 down against it so that spring 221 will hold it in that initial position. Magnet or solenoid 222 can then be deenergized, either manually or automatically by means of time delay relays or otherwise.

This clutch therefore provides a low-inertia driven element that can be stopped very quickly by means of automatically wound inertia means.

The inertia of element 209 may be automatically increased with increased speed by having weighted arms 227 pivoted at 228 to lugs on the outer face of the element and with tension springs 229 attached to the element and the arms and tending to reduce the radius of the weighted arms which are thrown outward by centrifugal force as the element 209 is revolved. Therefore the degree of resistance offered by inertia element 209 and the associated weighted arms will increase with increased speed so that disc 201 will be kicked in relatively reverse direction with more of an impulse as the speed before releasing latch 211 is increased. The calibration of the various members can be such that disc 201 is quickly brought to rest, upon release, for virtually all practicable speeds. Inertia element 209 can be geared to a fixed motor to bring it up to speed, a magnetic clutch being arranged to break connection between the two when the speed is reached.

In Figure 3 like parts are given like reference numerals as in Figure 2. The device of Figure 3 is generally similar to that shown in the preceding figure except that electric motor 230, mounted in a recess in inertia element 209 is used to wind spring 206 by means of pinion 231 in cooperation with internal ring gear 232 fastened to or integral with disc 201 coaxially therewith. Pinion 231 is attached to iron or steel sleeve 233 which is keyed to the motor shaft and is pulled into solenoid 234 attached to the motor and electrically connected therewith, when the motor and solenoid are energized with current passing through lines 226 and 225 and connected slip rings 213. As before, pawl 205 and associated notches in disc 201 and pawl 207 and associated notches in inertia element 209 will cause spring 206 to be wound when disc 201 is rotated in forward direction relative to inertia element 209 but disc 201 may be freely rotated in reverse direction relative to pawl 205, and inertia element 209 can be freely rotated on shaft 195 in forward direction relative to pawl 207.

Figure 4:
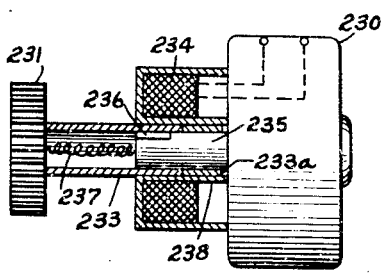
Figure 4 is a part sectional side elevation of the electric motor and associated solenoid gear shift mechanism used in the device of Figure 3.

The details of construction of sleeve 233 and solenoid 234 are illustrated in Figure 4. Shaft 235 of motor 230 has an end slot in which key 236 projecting inwardly from sleeve 233 is longitudinally slidable. Sleeve 233 which carries pinion 231 is made of brass or other non-magnetic material but has a welded iron end portion 233a which normally projects inwardly away from solenoid coil 234 connected with the motor 230. Tension spring 237, attached to the inner face of pinion 231 and to the end of shaft 235, normally holds sleeve 233—233a in the position indicated. When, however, motor 230 and connected solenoid 234 are energized, iron sleeve portion 233a is pulled leftward into the solenoid coil and pinion 231 is quickly shifted to the left (Figure 3) to engage ring gear 232.

Central tube 238 of the solenoid may be of brass, bronze or other non-magnetic material, as may be shaft 235, if desired. Sleeve 233—233a is slidable and rotatable in tube 238. It is obvious, therefore, that spring 237 normally holds pinion 231 out of engagement with ring gear 232 but when the solenoid is energized the pinion is quickly moved over into mesh with gear 232 and motor 230 simultaneously rotates the pinion in such direction that spring 206 is wound. This occurs when coil or winding 198 is energized so that disc 201 is first pulled around with element 197 and then motor 230 winds the spring and keeps it wound as long as motor 230 and the solenoid are energized. Motor 230 will be brought to a stop as far as its relative shaft rotation is concerned but its winding is sufficiently heavy so that it will not be damaged by heavy currents. Therefore, soon after lines 226 are energized, spring 206 is wound and inertia element 209 is rotated with disc 201.

When circuit lines 226 are deenergized, disc 201 is magnetically released as before, and spring 237 quickly pulls pinion 231 out of engagement with ring gear 232 so that pawl 205, driven by spring 206, gives disc 201 a quick relative reverse kick to bring it to rest and inertia element 209 is kicked in forward direction so that it spins freely on shaft 195.

It will be understood that the drawings of the various clutches or transmissions are largely diagrammatic and do not necessarily show the actual details of construction of commercial embodiments. For instance the bearings for shafts are shown as posts extending from bases whereas they could conveniently be made as parts of casings. Furthermore, various bearings would be longer in actuality than illustrated, in order to provide adequate bearing surfaces.

Numerous changes of detail can be easily arranged without departing from broad principles disclosed.

What I claim is:

1. In a clutch, a driving member, a driven member, inertia means associated with said driven member, means including energy storing means connecting said driven member and said inertia means, means for releasing energy in said energy storing means to cause relative movement between said driven member and said inertia means, said inertia means including means for changing the inertia thereof in accordance with the rotational speed of said inertia means.

2. In a clutch, a driving member, a driven member, an inertia element freely movable in one direction relative to said driven member after release thereof, means including energy storing means connecting said driven member and said inertia element, and means for producing relative movement between said driven member and said inertia element to store energy in said energy storing means.

3. In a mechanism, a shaft, a member fastened to said shaft, an inertia element freely rotatable in one direction relative to said shaft, energy-storing means associated with said member and said inertia element, means for causing energy to be stored in said energy storing means and for releasing energy therefrom so that the speed of revolution of said member and said shaft will be changed as a result of momentum imparted to said inertia element by said energy-storing means.

4. In a clutch, a driving member, a driven member, inertia means, and means including energy-storing means associating said driven member with said inertia means to cause movement of said inertia means in a direction to reduce the speed of rotation of said driven member when said stored energy is released.

5. In a clutch, a driving member, a driven member, inertia means, means including energy-storing means associating said driven member with said inertia means to cause movement of said inertia means in a direction to reduce the speed of rotation of said driven member when said stored energy is released, and means for moving said inertia means relative to said driven member to store energy in said energy-storing means.

6. In a clutch, a driving member, a driven member, inertia means, means including energy-storing means associating said driven member with said inertia means to cause movement of said inertia means in a direction to reduce the speed of rotation of said driven member when said stored energy is released, means for moving said inertia means relative to said driven member to store energy in said energy-storing means, and means for latching said inertia means to cause rotation thereof with said driven member.

7. In a clutch, a driving member, a driven member, a rotatable inertia element, means including energy storing means associating said driven member with said inertia element to cause rotation of said inertia element in a direction to reduce the speed of rotation of said driven member when said stored energy is released, means for causing relative rotation between said driven member and said inertia element to store energy in said energy-storing means in such manner that said inertia element will be accelerated in the same direction of rotation as the normal direction of said driven member, when said stored energy is released, and means for causing release of said stored energy.

8. In a clutch, a driving member, a driven member, rotatable inertia means, means including a spring and a ratchet member connecting said inertia means and said driven member, and motor-driven means for causing relative rotation between said driven member and said inertia means to wind said spring.

9. In a clutch, a driving member, a driven member, a rotatable inertia element, means including a spring and a ratchet member connecting said inertia element and said driven member, motor-driven means for causing relative rotation between said driven member and said inertia element to wind said spring, and latch means for maintaining said spring in wound condition.

10. In a clutch, a driving member, a driven member, a rotatable inertia element, means including a spring and a ratchet member connecting said inertia element and said driven member, means including a motor for causing relative rotation between said driven member and said inertia element to wind said spring, latch means for maintaining said spring in wound condition, and electrical means for simultaneously making ineffective the driving of said driven member and said latch means.

11. In a clutch, a driving member, a driven member, a rotatable inertia element, means including a spring and a ratchet member connecting said inertia element and said driven member, means for causing said spring to be wound, and means for causing effective simultaneous disengagement of said clutch and release of said spring to accelerate said inertia element and to retard rotation of said driven member.

12. In a clutch, a driving member, a driven member, a rotatable inertia element, means including a spring associating said driven member and said inertia element, means for causing relative rotation of said driven member and said inertia element to wind said spring, and means for limiting the degree of winding of said spring.

13. In a clutch, a driving member, a driven member, a rotatable inertia element, means including a spring and ratchet associating said driven member and said inertia element so that said spring is wound when said driven member and said inertia element are rotated relatively in one sense and so that said inertia element can be rotated freely by said wound spring when released, and means including a motor for causing relative rotation between said inertia element and said driven member to wind said spring.

14. In a clutch, a driving member, a driven member, inertia means, means including energy-storing means associating said driven member with said inertia means to cause movement of said inertia means in a direction to change the speed of movement of said driven member when said stored energy is released, and means for regulating the rate of said movement of said inertia means in proportion to the speed of movement of said driven member.

15. In a clutch, a driving member, a driven member, inertia means, means including energy-storing means associating said driven member with said inertia means to cause movement of said inertia means in a direction to change the speed of rotation of said driven member when said stored energy is released, and centrifugal means rotated in proportion to the speed of said driven member for changing the effective inertia of said inertia means.

ALBERT G. THOMAS.

REFERENCES CITED

The following references are of record in the file of this patent:

UNITED STATES PATENTS

| Number | Name | Date |
| --- | --- | --- |
| Re. 14,271 | Morrison | Mar. 13, 1917 |
| 744,423 | Steckel | Nov. 17, 1903 |
| 786,413 | Cutler | Apr. 4, 1905 |
| 896,608 | Ast | Aug. 18, 1908 |
| 1,161,066 | Minor | Nov. 23, 1915 |
| 1,238,447 | Severy | Aug. 28, 1917 |
| 1,569,651 | Costello | Jan. 12, 1926 |
| 1,793,586 | Burger | Feb. 24, 1931 |
| 2,120,734 | Cotal | June 14, 1938 |
| 2,180,474 | Leece | Nov. 21, 1939 |
| 2,407,450 | Reilly | Sept. 10, 1946 |
| 2,422,040 | Rader | June 10, 1947 |
| 2,435,112 | Weightman | Jan. 27, 1948 |